US008452816B1

(12) United States Patent
Goudreau, Jr. et al.

(10) Patent No.: US 8,452,816 B1
(45) Date of Patent: May 28, 2013

(54) MANAGING DATABASE ACCESS

(75) Inventors: Robert F. Goudreau, Jr., Cary, NC (US); Saurbh M Pathak, Cary, NC (US); Miles A. DeForest, Bahama, NC (US); David Haase, Fuquary Varina, NC (US); Jackson Brandon Myers, Cary, NC (US); Sriram Nagasubramanian, Morrisville, NC (US); Michael P. Wagner, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 305 days.

(21) Appl. No.: 12/750,919

(22) Filed: Mar. 31, 2010

(51) Int. Cl.
*G06F 17/30* (2006.01)
(52) U.S. Cl.
USPC .......................................................... 707/802
(58) Field of Classification Search
None
See application file for complete search history.

(56) References Cited

U.S. PATENT DOCUMENTS

| 2005/0216860 | A1* | 9/2005 | Petrov et al. | 715/810 |
| 2007/0220089 | A1* | 9/2007 | Aegerter | 709/203 |
| 2008/0163160 | A1* | 7/2008 | Bloesch et al. | 717/104 |
| 2009/0248727 | A1* | 10/2009 | Hughes | 707/101 |
| 2011/0173168 | A1* | 7/2011 | Jones et al. | 707/695 |

OTHER PUBLICATIONS

Roddick, A survey of schema versioning issues for database systems, Elsevier Science B.V. 1995.*

* cited by examiner

*Primary Examiner* — Neveen Abel Jalil
*Assistant Examiner* — Kevin L Young
(74) *Attorney, Agent, or Firm* — Krishnendu Gupta; Jason A. Reyes

(57) ABSTRACT

A method is used in managing database access. A framework is provided for translating versioned data between memory and persistent storage. Based on the framework, read and write requests that access records in a database are translated. Based on the framework, it is made to appear that the database is a different version of the database.

16 Claims, 3 Drawing Sheets

MANAGING DATABASE ACCESS

BACKGROUND

1. Technical Field

This application generally relates to managing database access.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

All database management systems store and manipulate information. A "database" is a collection of tables. All database management systems have some mechanism for getting at the information stored in a database. Such a mechanism involves specifying data retrieval operations, often called "queries", to search the database and then retrieve the requested information.

RAID (Redundant Array of Independent or Inexpensive Disks) parity schemes may be utilized to provide error detection during the transfer and retrieval of data across a storage system (also known as storage arrays or arrays).

RAID, logical disk units, disk drives and other objects and concepts make up layers of legacy array logical components mapped to one another, and any errors in such mapping may adversely affect access to data.

SUMMARY OF THE INVENTION

A method is used in managing database access. A framework is provided for translating versioned data between memory and persistent storage. Based on the framework, read and write requests that access records in a database are translated. Based on the framework, it is made to appear that the database is a different version of the database.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

As described below, a technique is provided that may be used in managing database access, particularly for providing a generic framework for translating versioned data between memory and persistent storage. In at least one implementation, use of the technique permits isolation from the rest of a system of the differences between various versions of a persistently-stored database, and makes it appear that the database is always using its most current version, by automatically translating read and write requests that access records in the database. This frees other parts of the system from having to understand older versions of the storage format of the database, and it also enables the system to run new versions of system software immediately without disrupting access to objects in the database and without requiring permanent conversion of the persistent data to the database format used by the most current version. The latter feature makes it possible to test new versions of system software without giving up the option to switch back to older versions.

Figure 1:
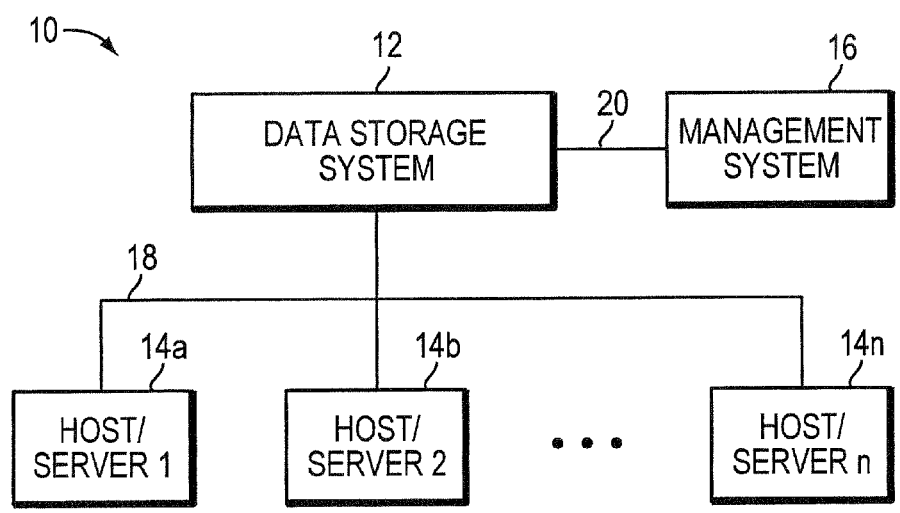
FIG. 1 is an example of an embodiment of a system that may utilize the techniques described herein.

Referring to FIG. 1, shown is an example of an embodiment of a computer system that may be used in connection with performing the technique described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with configuring and provisioning the data storage for use by the hosts in connection with techniques described herein. As an example that may executed on the hosts 14a-14n, the data storage configuration and provisioning tasks may include allocating storage for user accounts or mailboxes, specifying the devices (logical and/or physical) used to store the email data, specifying whether data replication is performed for disaster recovery, configuring the physical devices in one or more RAID groups and other logical entities, and the like. Techniques that may be used in connection with performing data storage configuration, and configuration and provisioning tasks are described in more detail in following paragraphs.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the technique as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes. Data storage devices may also be configured using other logical device layers on top of the LV or LUN which are then exposed to the host or other component using the configured data storage.

In the following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

Described in the following paragraphs are techniques that may be used in restoring configurations of data storage systems in an automated fashion, which, for example, may be customized for checking data storage system configurations to ensure that the configurations are not corrupt. However, the described applications and implementations are only examples; the techniques herein may be adaptable to other applications and/or to the particular knowledge level of the user.

Figure 2:
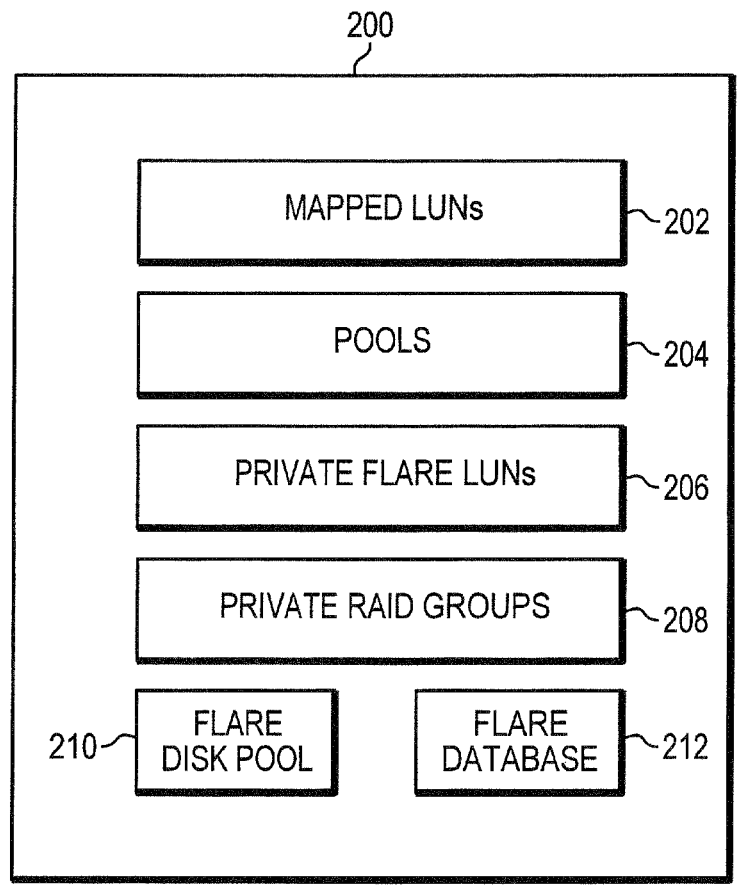
FIGS. 2-3 are example representations of array logical components in at least one embodiment of the techniques described herein.

Referring to FIG. 2, shown is an example representation of legacy array logical components in an embodiment of an array 200 in accordance with the techniques herein. The array 200 may be included in the data storage system 12. FIG. 2 illustrates how Mapped Logical Unit Numbers (LUNs) 202 are created on top of the legacy array logical components, such as RAID Groups and data storage operating system ("Flare") local volumes referred to as Flare LUNs or FLUs. A Persistent Storage Manager LUN (PSM), described below, is located on the first five drives of the array 200 and stores configuration information, typically used for diagnostic purposes, such as disks, RAID Groups, and FLUs. Flare Disk Pool 210 is a named collection of disks managed by Flare, used to create storage pools, which include groups of disks configured to be in a single pool of storage. Flare database 212 keeps track of RAID Groups and FLUs, particularly, which RAID Groups are contained within each FLU.

Private RAID Groups 208 and Private FLUs 206 are built on top of the Flare Disk Pool 210, Flare database 212, and PSM. Both 206 and 208 are private, as they are not directly visible or accessible by the user. Storage pools 204 are then built on top of the Private RAID Groups 208 and Private FLUs 206. For example, the storage pools 204 may include thin pools, which are types of storage pool. (A description of storage pools and some information associated with storage pool creation is provided in the patent application entitled CONTROLLING MULTI-STEP STORAGE MANAGEMENT OPERATIONS, patent application Ser. No. 12/241,417, filed Sep. 30, 2008, which is hereby incorporated by reference herein.) Mapped LUNs 202 are built on top of the storage pools 204. Mapped LUNs 202 are formed from storage pools 204 and may store data that is physically stored in a location that maps to the logical location of the Mapped LUNs 202.

FIG. 2 illustrates a conventional configuration of array logical components in at least one embodiment of the technique described herein. Meta data exists on the array 200 and represents at least some of the configuration of the array 200. The meta data, described in further detail below, helps describe how each object of the array 200 is stored above one another and in what order each is stored.

The meta data exists on the PSM and describes the configuration of the array 200 at its current state. In at least one embodiment, the meta data contains all configuration information on the array 200 and is a snapshot of the entire configuration, including IP addresses, RAID Groups, FLUs, storage pools and other logical objects.

Figure 3:
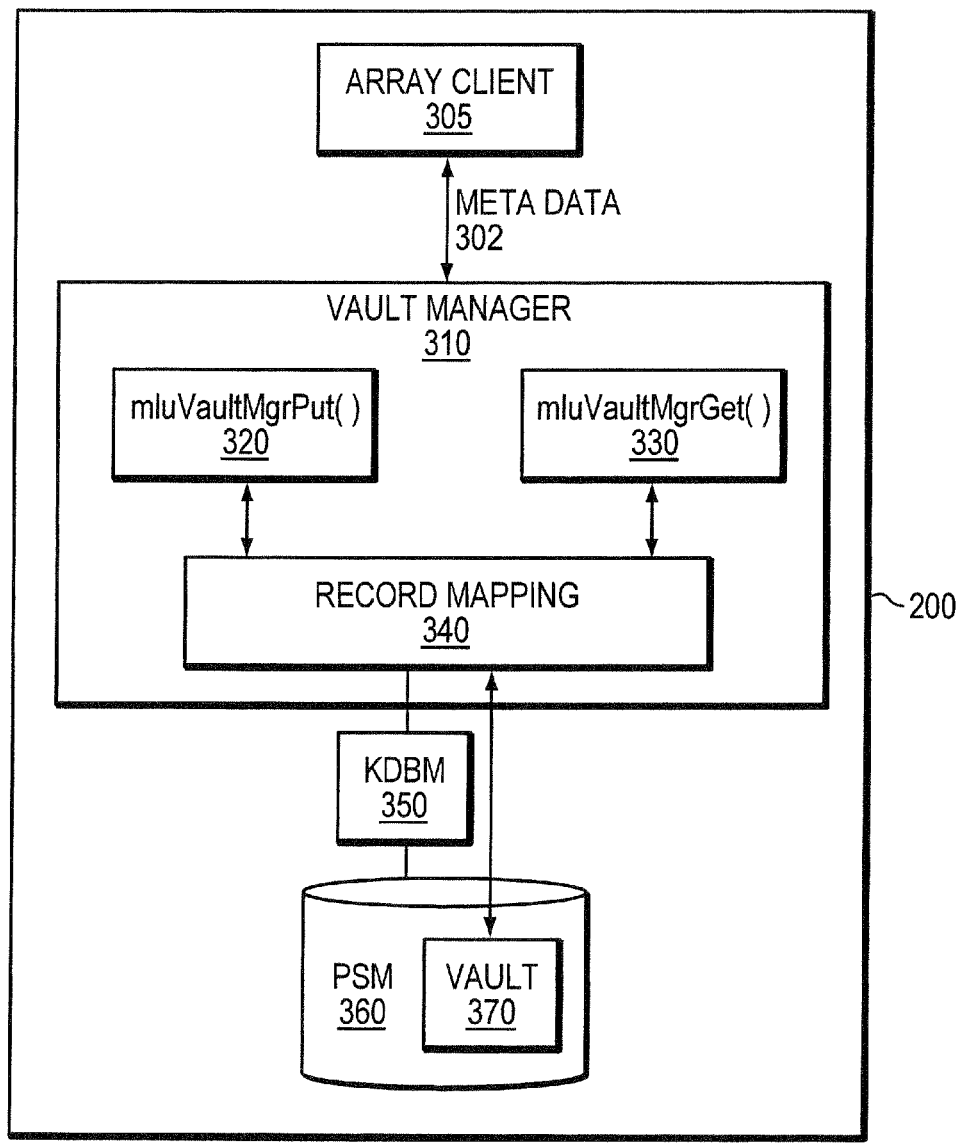

FIG. 3 illustrates an example implementation of functionality of array 200 in accordance with the technique described herein, in which at least some of the meta data denoted meta data 302 is stored and retrieved by an array client 305 (e.g., mapped LUN driver) using vault manager 310, a kernel database manager (KDBM) 350, and the PSM, here denoted PSM 360, having vault 370.

KDBM 350 is a kernel library that provides persistent record-oriented storage with transactional semantics for use by kernel mode drivers. A KDBM database presents a client (e.g., client 305) with a set of "tables" that behave as a persistent array of fixed-sized records. KDBM allows clients to make a series of record-updates and then atomically commit those changes. KDBM extends the functionality of the PSM with enhanced transactional semantics and to satisfy a demand for PSM data-areas. When a client creates a KDBM database, it provides a name and a "schema" that specifies the number of tables in the database, and the size and number of records in each table. The client begins its interactions with KDBM by "Attaching" to a database which has the effect of allocating the resources necessary to interact with the database. The client then manipulates records in the database by issuing a series of "Operations" to start transactions, put and get records and then completes transactions by committing the changes or discarding them. Other operations outside the context of a transaction allow the client to query or modify aspects of the database such as the size and or number of tables. The client ends its interaction with KDBM by "Detaching" which releases the resources acquired when the client attached. KDBM maps a collection of tables, the KDBM database, onto a single PSM data-area. This arrangement allows KDBM to leverage PSM's atomic-update characteristics to provide clients with a richer transactional mechanism and reduce their need to use many small PSM data-areas which are a relatively scarce resource in a large system.

Vault manager 310 implements a service layer above KDBM. Vault manager 310 uses the services of KDBM to increase the functionality of managing persistent data with transaction semantics. A public interface of vault manager 310 provides its client (e.g., client 305) with a persistent data management mechanism. A private implementation uses KDBM services to accomplish persistent data management. A client's persistent data is managed in its vault (e.g., vault 370). Each vault is a collection of objects of various types.

The public interface of vault manager 310 furnishes insert, delete, update, lookup and iteration (getnext) operations for the client to manage its persistent data. KDBM requires the data to be stored in single contiguous block of memory while the vault manager allows a client to keep its data in multiple non-contiguous blocks of memory (i.e., data-structures) and translate between the two different representations.

Where the client needs a mechanism to store parts of data from a contiguous block of memory and the client's persistent data is composed of several data structures and the client needs to store and retrieve them all as a unit, the vault manager offers this kind of flexibility in managing the client's persistent data by associating a data descriptor with the client's persistent data.

For managing the client's persistent data efficiently, the vault manager interface requires the client to identify stored data with a unique identifier which is used to update and remove such data from the vault. Internally, the vault manager maps such unique identifiers to indices required by the KDBM.

After the client's initial release, the client may need to upgrade its vault, which may involve change in the number of objects stored, the data stored for an object, and/or the types of object stored, and this is supported by the vault manager.

FIG. 3 illustrates enhanced functionality of vault manager 310 in accordance with the technique, which is provided at least in part to help handle a case in which client 305 needs to be able to interact effectively with vault 370 even if vault 370 is an old version not expected by client 305. In a particular example, the contents and layout of the tables of meta data in vault 370 may be in accordance with an old version of such contents and layout that is incompatible with a storage scheme expected by client 305.

In accordance with at least one implementation of the technique, all knowledge of which version of the vault is in use is isolated to a portion of the vault manager. The vault manager is responsible for providing a consistent presentation to clients such as client 305, one which makes it appear such clients as if a current version vault is present, even if the actual vault 370 uses an older layout, or does not exist at all. A benefit of such misdirection is that the remainder of the client can thus be unaware of the differences between vault versions. The enhanced functionality maps any existing old version vault data into a current version format, allowing vault clients to read and write vault records in the same way, regardless of which version of vault 370 exists. Each record is the smallest accessible unit in the vault, containing persistent metadata for one particular respective object.

The enhanced functionality's principal features are a Deflection Mechanism, which redirects certain low-level vault requests (read record, write record) depending on which version of vault (if any) is present; and a Record Mapper for each set of Deflection routines, which translates between the current vault layout and other vault layouts (including a null vault case where there is no vault).

The Deflection Mechanism replaces two low-level vault record access routines with new routines mluVaultMgr-Get( )330 and mluVaultMgrPut( )320 for handling read and write requests respectively. Instead of calling KDBM directly, these routines take one of three divergent paths, depending on what version of vault already exists on the array: Current Path, Null Path, or Pre-Current Path.

Current Path: This is used when vault 370 is a current version, and specifies that KDBM is called directly, without any other Record Mapping logic 340 required.

Null Path: This is used when array 200 has no pre-existing vault. A minor form of Record Mapping logic 340 is used, in which all attempts to read vault records will succeed but return empty (zero-filled) records, and all attempts to write vault records will fail. This behavior allows the client 305 to come up gracefully and "discover" well-known objects but nothing else.

Pre-Current Path: This is used when array 200 has a vault with a pre-current layout. This is handled via a set of table-specific Record Mapping logic 340 processes tailored to handle the differences between pre-current and current vault layouts.

The Deflection Mechanism is established at boot time, based on whether a vault is discovered, and if it is, which version of persistent metadata it contains.

With respect to Record Mappers of Recording Mapping logic 340, as noted above, two of the three Record Mappers are minor. The Current Path's Record Mapper is a no-op that goes directly to KDBM, while the Null Path's Record Mapper avoids KDBM entirely and just returns zeroes on reads and fails writes. The following is therefore focused exclusively on the Pre-Current Path's Record Mapper, which translates between the pre-current vault format and the current vault format.

With respect to mapping principles, at least one implementation of the Pre-Current Path's Record Mapper adheres to the following rules:

1) All Current tables must appear to be present, in current order and with current dimensions. Since the point of the enhanced functionality is to make it impossible to determine which version of vault 370 actually exists, the Record Mapper must make it look like all current tables are present in their entirety, and must prevent any pre-current tables from being directly accessible.

2) Reads of nonexistent tables or nonexistent records must succeed but return zero-filled data, except as described below. Similar to the Null Path's Record Mapper, this Mapper will also pretend that any record within the bounds of the current table layout exists and is filled with zeroes (which signifies an empty record in KDBM terms).

3) Writes to nonexistent tables or nonexistent records must fail, except as described below. The flip-side of the previous rule is that writes to non-existent records generally cannot be accommodated, due to a lack of backing store.

4) Reads of individual object records to which new persistent properties have been added in the current vault version must fill the new structure elements with suitable "vanilla" values. Most pre-current vault records have current counterparts, but some of those record types have been enhanced with new fields in the current version. When reading such objects' records, the enhanced functionality will interpolate any such missing data with the default value for the property in question that a pre-existing object would automatically be expected to receive under the current version. For example, a file system object's new TieringPreference attribute is set to "No Preference" for all existing file system objects. Note that by keeping to "vanilla" values for new properties, the enhanced functionality allows the array to revert to the earlier version without losing information on existing objects.

5) Writes of individual object records to which new persistent properties have been added in the current version must fail unless the new structure elements contain the "vanilla" values discussed above. In order to avoid precluding revert operations, any attempt to modify a new-in-current property of an existing object must be denied, as there is not yet any backing store in which the new property value could be saved and it cannot be stored in the old record's reserved space in a backward compatible way. However, there is one general exception to this rule: if the entire record being written contains zeroes (indicating to KDBM that the record container is being vacated because the object has been deleted), no checking for vanilla values will be performed, even in the case of non-zero vanilla values.

6) Reads and writes of records in certain new-in-current tables must be satisfied by reads and writes to old tables. For examples, a file object table and VU object table must be satisfied by reads and writes to an old mapped LUN object table, including the appropriate transformation of record contents, because in the current system the old legacy mapped LUN object has been replaced by the file object table and VU object table pair. In at least some cases, a current version object ID may need to be synthesized from the object ID of the corresponding old object, and current version existence dependency table records may need to be translated to and from, and/or synthesized from, old version records.

For example, five new object properties may be added in the current version:

| New Property | "Vanilla" Value |
|---|---|
| IsDirectFormat | FALSE |
| TierPreference | MLU_TIER_PREFERENCE_NONE |
| SliceRelocationPolicy | MLU_SLICE_RELOCATION_POLICY_OPTIMAL |
| ReorganizerFamily.ActiveProcessObjectId | 0 |
| FormatFamily.ActiveProcessObjectId | 0 |

In at least one implementation, array 200 not also supports accessing a pre-current vault but also converting a pre-current vault into a current version vault as part of a mapped LUN commit operation. Commit refers to a post-upgrade operation that irrevocably forces the array to adhere to the current version level, thereby converting any old version vault to the current vault layout.

In particular, vault manager 310 may also include vault switcher functionality, which is used during the commit operation to create a new current version vault, flush out its contents, and remove any pre-current vault that might exist. The vault switcher runs only during the commit operation, and is responsible for creating a new current version vault in place of any previous vaults. The vault switcher performs the following tasks:

1. Destroying the current version vault if one already exists (it could only do so as a side-effect of an unsuccessful previous commit operation)
2. Creating a new (but empty) vault using the current layout
3. Replacing the current Record Mapper with the current Record Mapper
4. Flushing all persistent objects from memory to the new vault
5. Flushing all existence dependencies from memory to the new vault
6. Destroying the old vault (if any), but only after all data has successfully been flushed to the new vault
7. Notifying a peer storage processor of the successful operation, which means that it must also start using the current Record Mapper.

An embodiment may implement the techniques herein using code executed by a computer processor. For example, an embodiment may implement the techniques herein using code which is executed by a processor of the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be access by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method for use in managing database access, the method comprising:
    providing a framework in a data storage system for translating versioned data between memory and persistent storage, wherein the framework comprises:
        an isolation mechanism that isolates a version of a database from a client;
        a deflection mechanism providing divergent paths for handling I/O requests for each of a no database, a current version database and a pre-current version database based on which one of the no database, the current version database and the pre-current version database is present in the persistent storage; and
        a record mapper for each of the deflection routines of the deflection mechanism;
    based on the framework, translating a pre-current version database format in persistent storage or a no database version into a current version database format using the record mapper in response to an I/O request from the client to access records in the pre-current version database or the no database version, the translating comprising returning the pre-current data records and default values for fields added in the current version when a pre-current version exists and returning zero-filled data when no database exists; and
    based on the framework, providing an appearance to the client that the accessed pre-current version database or the no database version is the current version database.

2. The method of claim 1, wherein the framework provides isolation from the differences between the pre-current and the current versions of database.

3. The method of claim 1, wherein the framework provides system software with access to objects in the pre-current version of the database without requiring permanent conversion of the database to the current version of the database.

4. The method of claim 1, wherein the framework allows testing of system software with the current version of the database with an option of switching back to the pre-current version of the database.

5. The method of claim 1, wherein the framework comprises a kernel library that provides persistent record-oriented storage with transactional semantics for use by kernel mode drivers, further wherein the deflection mechanism and the record mapper implement a service layer above the kernel library for managing persistent data with transaction semantics.

6. The method of claim 1, wherein the framework uses table-specific processes tailored to handle the differences between the pre-current and current versions of the databases.

7. The method of claim 1, wherein the framework prevents tables of the pre-current version of the database from being directly accessible outside the framework.

8. The method of claim 1, wherein the framework effectively causes elements of the current version of the database to be filled with vanilla values.

9. A system for use in managing database access, the system comprising a processor comprising a program logic for carrying out the steps of:
    first logic providing a framework in a data storage system for translating versioned data between memory and persistent storage, wherein the framework comprises:
        an isolation mechanism that isolates a version of a database from a client;
        a deflection mechanism providing divergent paths for handling I/O requests for each of a no database, a current version database and a pre-current version database based on which one of the no database, the current version database and the pre-current version database is present in the persistent storage, and
        a record mapper for each of the deflection routines of the deflection mechanism;
    second logic translating, based on the framework, a pre-current version database format in persistent storage or a no database version into a current version database format using the record mapper in response to an I/O request from the client to access records in the pre-current version database or the no database version the translating comprising returning the pre-current data records and default values for fields added in the current version when a pre-current version exists and returning zero-filled data when no database exists; and third logic providing, based on the framework, an appearance to the client that the accessed pre-current version database or the no database version is the current version database.

10. The system of claim 9, wherein the framework provides isolation from the differences between the first and second pre-current and the current versions of database.

11. The system of claim 9, wherein the framework provides system software with access to objects in the pre-current version of the database without requiring permanent conversion of the database to the current version of the database.

12. The system of claim 9, wherein the framework allows testing of system software with the current version of the database with an option of switching back to the pre-current version of the database.

13. The system of claim 9, wherein the framework comprises a kernel library that provides persistent record-oriented storage with transactional semantics for use by kernel mode drivers, further wherein the deflection mechanism and the record mapper implement a service layer above the kernel library for managing persistent data with transaction semantics.

14. The system of claim 9, wherein the framework uses table-specific processes tailored to handle the differences between the pre-current and current versions of the databases.

15. The system of claim 9, wherein the framework prevents tables of the pre-current version of the database from being directly accessible outside the framework.

16. The system of claim 9, wherein the framework effectively causes elements of the current version of the database to be filled with vanilla values.

* * * * *